(12) United States Patent
Ohtsuka et al.

(10) Patent No.: US 8,262,266 B2
(45) Date of Patent: Sep. 11, 2012

(54) ILLUMINATING LAMP

(75) Inventors: Haruhito Ohtsuka, Makinohara (JP);
Ryohei Ochiai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 125 days.

(21) Appl. No.: 12/654,917

(22) Filed: Jan. 8, 2010

(65) Prior Publication Data

US 2010/0208482 A1  Aug. 19, 2010

(30) Foreign Application Priority Data

Feb. 18, 2009 (JP) ................. 2009-034937

(51) Int. Cl.
*B60Q 3/02* (2006.01)
(52) U.S. Cl. .................................. 362/490; 362/488
(58) Field of Classification Search .............. 362/488, 362/490, 492
See application file for complete search history.

(56) References Cited

U.S. PATENT DOCUMENTS

| | | | | |
|---|---|---|---|---|
| 6,886,969 B2* | 5/2005 | Nagata | ........................... | 362/488 |
| 7,232,245 B2* | 6/2007 | Suzuki et al. | .................. | 362/488 |
| 7,503,678 B2* | 3/2009 | Okabe et al. | ................... | 362/490 |
| 7,775,694 B2* | 8/2010 | Nagai et al. | .................... | 362/490 |
| 2005/0245250 A1* | 11/2005 | Ebenshpanger | .............. | 455/421 |
| 2010/0195348 A1* | 8/2010 | Ohtsuka et al. | ............... | 362/546 |

FOREIGN PATENT DOCUMENTS

JP    2006-031966    2/2006

\* cited by examiner

*Primary Examiner* — Peggy A. Neils
(74) *Attorney, Agent, or Firm* — Edwards Wildman Palmer LLP

(57) ABSTRACT

An illuminating lamp which can be easily assembled is provided. The illuminating lamp includes a decorative component including a mounting member mountable to an opening provided to a roof trim of a vehicle and a lens mounted on a compartment side of the mounting member, and a functional component including a light source and a holder which holds the light source and is mounted to the mounting member. The mounting member includes a flat plate to which the holder is mounted, an aperture provided at the flat plate to transmit light into the compartment, and a cover portion receiving the light source and reflecting the light of the light source into the compartment. The cover portion includes an opening portion at one end thereof along a longitudinal direction of the flat plate through which the light source is inserted along the flat plate.

6 Claims, 6 Drawing Sheets

ILLUMINATING LAMP

CROSS-REFERENCE TO RELATED APPLICATIONS

This application claims priority to Japanese Patent Application Number 2009-034937 filed on Feb. 18, 2009, the contents of which are fully incorporated herein by reference.

BACKGROUND

1. Field of the Invention

The present invention relates to an illuminating lamp mounted to a roof trim of a motor vehicle to illuminate a passenger compartment of the vehicle.

2. Description of Related Art

A passenger compartment of the vehicle is provided with a variety of compartment-illuminating lamps at a compartment roof. One example of the illuminating lamps includes an illuminating lamp which is inserted into an opening provided at a roof trim, which serves as an interior component of the compartment roof, to be mounted to the compartment roof, as disclosed in Japan Patent Publication Number 2006-31966.

Above-mentioned Japan Patent Publication Number 2006-31966 discloses an illuminating lamp having a decorative design portion mounted to an opening of a roof trim and arranged to expose to a vehicle compartment, a functional component mounted outside the decorative design portion and provided with light source, and a case provided with the functional component covering the opening of the roof trim.

The decorative design portion includes a housing mounted to the opening of the roof trim, a lens on the compartment side of the housing, and a plurality of engaging projections provided on the housing. The housing is formed into a flat shape so as to fit into the opening of the roof trim. The housing is further provided with a hole transmitting light of a light source into the compartment. The lens is formed flat and is made of synthetic resin through which light can transmit. The engaging projections are arranged at four corners of the housing and are arranged to pass through the opening of the roof trim and latch to an edge of the case when the housing is mounted to the opening of the roof trim.

The functional component includes the light source and a body retaining the light source. The body is formed into a substantially rectangular-box shape. Inside the body is provided with terminals electrically connected to a wire harness wired on a vehicle body, supplying electric power.

The case is formed into a substantially rectangular-box shape having an aperture on a base thereof. The case includes a mounting portion to which the functional component is mounted, and to which a body of the functional component is fitted. Furthermore, the case includes a reflection surface formed on an inner surface thereof to reflect the light from the light source into the compartment. The functional component is mounted by fitting the body into the functional component mounting portion of the case while the light source is pre-mounted inside the case.

The above-described illuminating lamp of the prior art is mounted to the compartment roof by first mounting the functional component in the case while the light source is disposed inside the case beforehand, then disposing the case at the opening of the roof trim so as to cover the opening from an outside of the compartment and to project towards compartment side, then inserting and fitting the housing of the decorative design portion into the opening of the roof trim so as the plurality of engaging projections passes through the opening to latch to the edge of the case. In that manner, the roof trim is sandwiched between the case and the housing of the decorative component, for mounting the illuminating lamp to the compartment roof.

However, since the illuminating lamp of the prior art is mounted to the compartment roof by first mounting the functional component in the case, then disposing the case at the opening of the roof trim, and then inserting and fitting the housing of the decorative design portion into the opening of the roof trim so as the plurality of engaging projections passes through the opening to latch to the edge of the case to mount the decorative component to the case having the functional component, assembling of the functional component, the case and the decorative component involves much time and effort.

SUMMARY OF THE INVENTION

In view of the above-described problem, an object of the invention is to provide an illuminating lamp which can be easily mounted to a vehicle compartment roof.

For achieving the above-described object, an illuminating lamp 1 includes: a decorative component including a mounting member mounted to an opening provided at an interior component of a vehicle having a compartment and a lens mounted at a vehicle compartment side of the mounting member; and a functional component including a light source and a holder holding the light source, wherein the holder is mounted at the mounting member. The mounting member includes: a flat plate to which the holder is mounted on a surface thereof; an aperture provided at the flat plate to transmit light of the light source into the compartment of the vehicle; and a cover portion receiving the light source thereinside. The cover portion is provided at an outer side of the compartment of the flat plate so as to cover the aperture and reflect the light of the light source into the compartment. The cover portion includes an opening portion at one end thereof along a longitudinal direction of the flat plate through which the light source is inserted along the flat plate.

For achieving the object, an illuminating lamp according to the present invention is the illuminating lamp as described above, where the decorative component includes engagement portions provided in a pair extending from the flat plate, wherein the engagement portions are arranged to locate the holder between the engagement portions and to engage with the holder. The functional component includes engaging projections provided in a pair which are arranged to project from the holder and arranged to engage with the respective engagement portions. The holder includes a contact portion, abutting on an outer edge of the opening portion so as to place the engaging projections and the engagement portions along a direction perpendicular to a longitudinal direction of the flat plate when the light source is inserted into the cover from the opening portion.

For achieving the object, an illuminating lamp according to the present invention is the illuminating lamp as described above, where the respective engagement portions include an inclined surface at a tip portion of the engagement portion, the inclined surfaces inclining depart from each other towards the tip portion of the engagement portion.

For achieving the object, an illuminating lamp according to the present invention is the illuminating lamp as described above, where the holder includes a wall portion which covers the opening portion of the cover portion when the holder is mounted to the flat plate.

As explained above, the illuminating lamp according to the present invention includes the cover portion which receives the light source, reflects the light of the light source towards the compartment side, and has the opening portion at one end which allows the insertion of the light source therethrough along the flat plate. As a result, by sliding the light source of the functional component from one side, the light source can be easily received inside the cover portion, so the functional component can be easily mounted to the decorative component. Furthermore, since the decorative component includes the cover portion, the size of the functional component can be downsized.

As explained above, since the illuminating lamp according to the present invention includes the holder having the contact portion which abuts with the outer edge of the opening portion when the light source is inserted through the cover portion from the opening portion, and which serves to locate the engaging projections provided on the holder and the engagement portions provided on the flat plate in a line along the engagement direction (a direction perpendicular to the longitudinal direction of the flat plate). Thus, by inserting the light source from the opening portion and receiving the light source inside the cover portion, the engaging projections and the engagement portions can be positioned so as to be arranged in a line along the engagement direction. As a result, the pair of the engaging projections and the pair of the engagement portion can be securely engaged. Consequently, the holder of the functional component can be securely fixed to the mounting member of the decorative component.

As explained above, since the engagement portions include the inclined surfaces, and the inclined surfaces are arranged at faces at the tip portions of the engagement portions facing each other and are inclined so as to depart from each other towards the tip portion, the respective engaging projections can be smoothly engaged with the respective engagement portions. As a result, the pair of engaging projections and the pair of engagement portions can be easily engaged together, achieving the easy mounting of the functional component to the decorative component.

As explained above, since the holder has the prominent wall portion closing (covering up) the opening portion of the cover portion, the light from the light source disposed inside the cover portion will not transmit through the opening portion. As a result, the light of the bulb can be successfully guided into the vehicle compartment.

DETAILED DESCRIPTION OF THE PREFERRED EMBODIMENT

An illuminating lamp according to one embodiment of the present invention is explained hereinafter with reference to FIGS. 1 to 9. An illuminating lamp 1 according to one embodiment of the present invention is mounted inside an opening 3 of a roof trim 2 which serves as an interior component of a motor vehicle to illuminate a passenger compartment of the vehicle. The roof trim 2 forms a roof of the vehicle and is made of a synthetic resin to be mounted to the passenger compartment.

Figure 1:
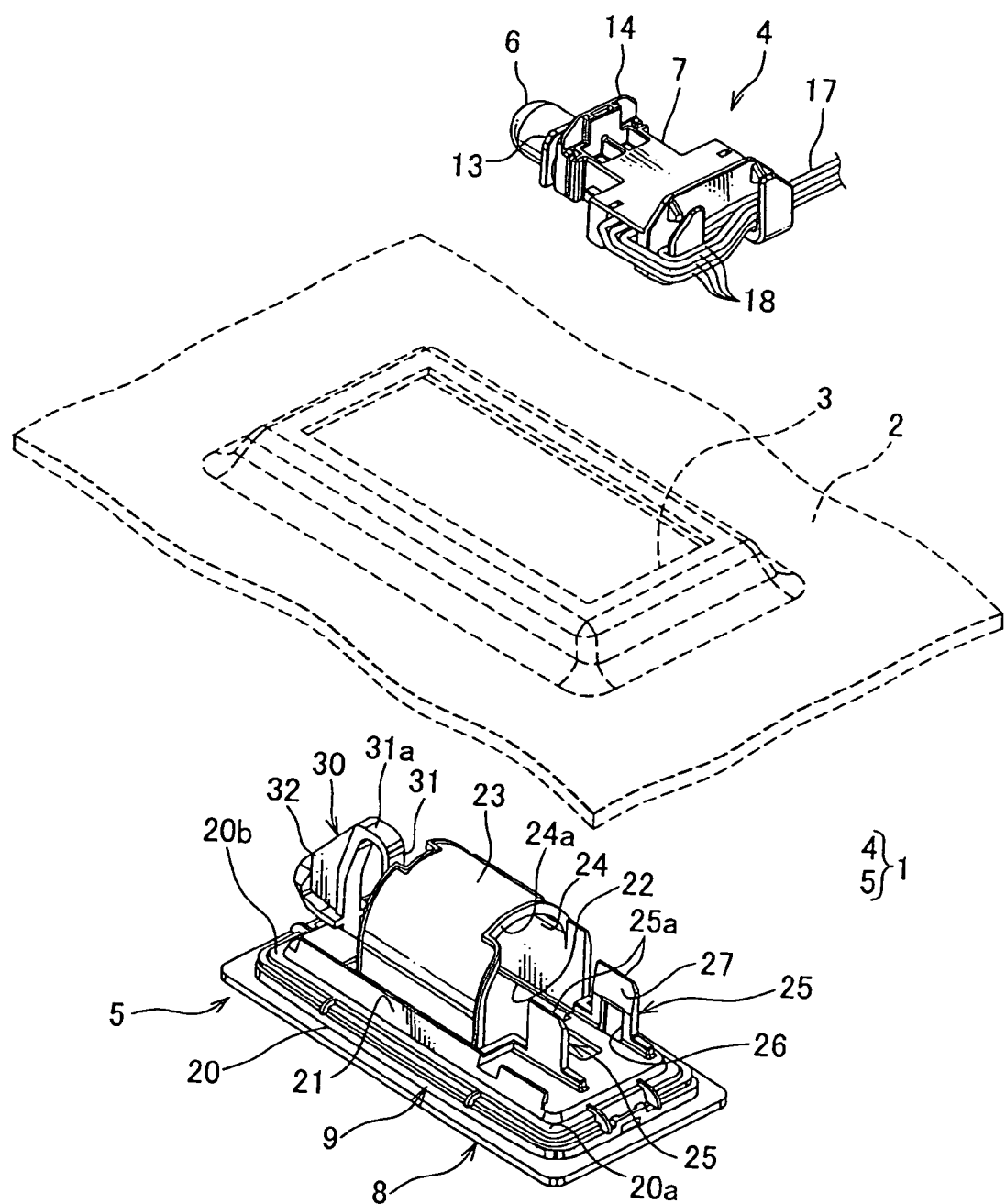
FIG. 1 is an exploded perspective view of an illuminating lamp according to an embodiment of the present invention.
Figure 2:
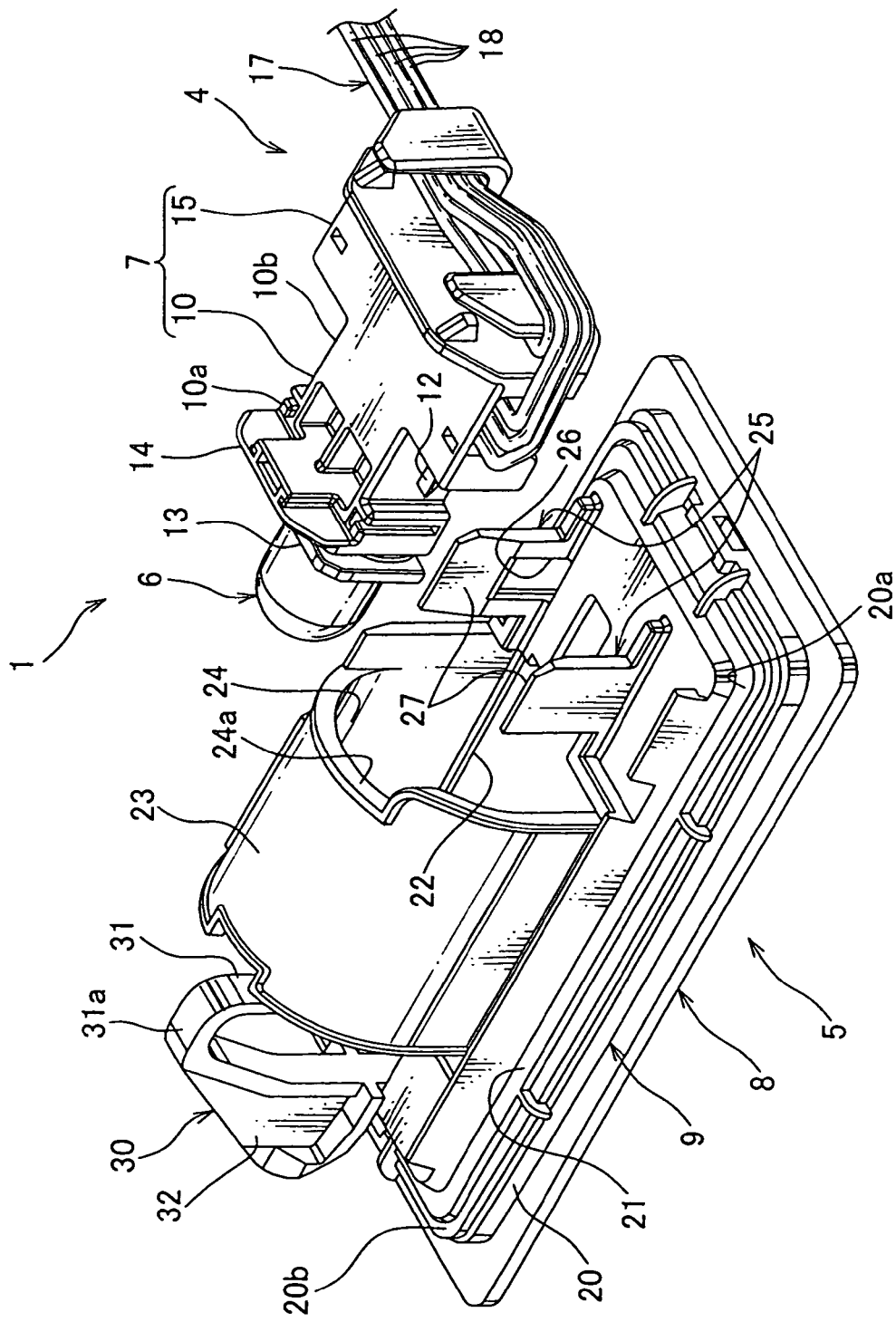
FIG. 2 is a perspective view of a functional component and a decorative component of the illuminating lamp according to the invention.
Figure 3:
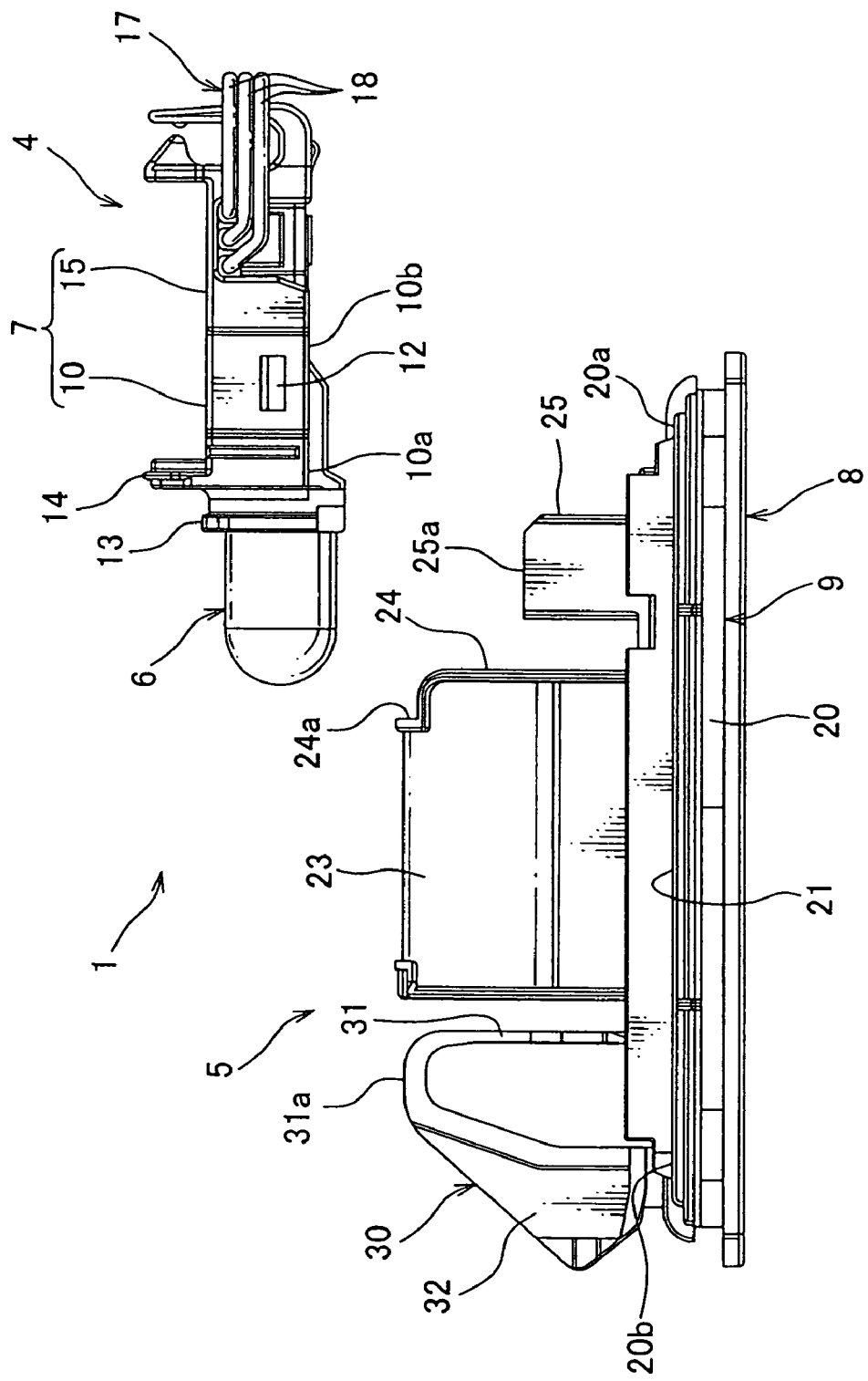
FIG. 3 is a side view of the functional component and the decorative component of FIG. 2.

As shown in FIG. 1, the illuminating lamp 1 includes a functional component 4 having a bulb (light source) 6 and a decorative component 5 arranged at the compartment side. The functional component 4 is mounted on the decorative component 5. A vehicle body panel (not shown) is located above the roof trim 2. The term "compartment side" is defined as a lower-portion side (down side) relative to the roof trim 2 of FIG. 1. The term "outer compartment side" used later on is defined as a side above the roof trim 2 of FIG. 1.

The functional component 4 includes: the bulb 6; a switch unit (not shown) switching electrical power supplied to the bulb 6; and a holder 7 containing the switch unit therein and holding the bulb 6. The switch unit includes a body having a power switching circuit and an operation lever projecting from the holder 7 to be located at the compartment side.

The holder 7 is made of synthetic resin and includes a bulb-mounting portion 10 having one end 10a to which the bulb 6 is mounted, and a container portion 15 containing the switch unit therein. The bulb-mounting portion 10 and the container portion 15 are formed integrally. The bulb-mounting portion 10 is formed into a substantially rectangular-box shape and has engaging projections 12 provided in a pair. The engaging projections 12 are provided at outer surfaces of the bulb-mounting portion 10, respectively, so as to extend towards an opposite direction from each other.

The opposed outer surfaces of the bulb-mounting portion 10 are arranged so as to be orthogonal with an imaginary line connecting one end 10a and the other end 10b of the bulb-mounting portion 10 and arranged so as to be orthogonal to the roof trim 2 when the illuminating lamp 1 is mounted to the roof trim 2.

The respective engaging projections 12 are arranged to extend from the outer surfaces of the bulb-mounting portion 10, and are arranged to engage with respective engaging recesses 26 of respective engagement portions 25 provided at a mounting member 9 of a decorative component 5.

The bulb-mounting portion 10 further includes a contact portion 13 and a prominent wall portion 14. The contact portion 13 is provided at the one end 10a of the bulb-mounting portion 10 and is arranged to be prominent in a circumferential direction of the bulb 6. When the bulb 6 is inserted into a cover portion 23 provided to a mounting member 9 of the decorative component 5, the contact portion 13 contacts with an outer edge 24a of an opening portion 24 of the cover portion 23 to determine a relative position of the engaging projections 12 and the engagement portions 25 to place the engaging projections 12 and the engagement portions 25 in a line along an engagement direction thereof.

The prominent wall portion 14 is provided at the bulb-mounting portion 10 and is arranged in parallel with and adjacent to the contact portion 13. The prominent wall portion 14 is provided closer to the other end 10b of the bulb-mounting portion 10 relative to the contact portion 13. The prominent wall portion 14 is arranged to be prominent relative to the contact portion 13 in the circumferential direction of the bulb 6. The prominent wall portion 14 is arranged to cover the opening portion 24 of the cover portion 23 when mounted to the decorative component 5. The prominent wall portion 14 corresponds to the wall portion described in claims.

The container portion 15 is connected to the other end 10b of the bulb-mounting portion 10 and is formed into a substantially rectangular-box shape. The container portion 15 also includes a bus bar (not shown) connected to the bulb 6 and the operation lever therein. The bus bar connects the bulb 6 and the operation lever to a plurality of electric wires 18 of a wire harness 17 of a vehicle body. The plurality of electric wires 18 of the wire harness 17 is connected to a power source such as battery provided to the vehicle body to supply electric power to the bulb 6.

The holder 7 of above-described structure is mounted to a flat plate 20 of the mounting member 9 by the respective engaging projections 12 engaging with the respective engaging recesses 26 of the respective engagement portions 25 provided at the mounting member 9 of the decorative component 5.

The decorative component 5 includes: a lens 8 transmitting the light from the bulb 6 into the compartment; and the mounting member 9 to which the lens 8 and the functional component 4 are mounted. The mounting member 9 is mounted to the opening 3 of the roof trim 2.

The lens 8 is made of transparent or semi-transparent synthetic resin through which the light from the bulb 6 can transmit. The lens 8 is formed into a flat-plate shape. The lens 8 is mounted at the compartment side of the flat plate 20 of the mounting member 9 and is arranged to expose to the compartment side when the mounting member 9 is mounted to the opening 3 of the roof trim 2.

The mounting member 9 is made of synthetic resin and includes: the flat plate 20 arranged in parallel to a planar direction of the roof trim 2; an aperture 22 passing the light from the bulb 6 into the compartment; the cover portion 23 reflecting the light from the bulb 6 into the compartment; the pair of engagement portions 25 engaging with the pair of engaging projections 12 of the functional component 4; and a lock portion 30 fixing the mounting member 9 to the opening 3 of the roof trim 2.

The flat plate 20 is disposed at the compartment side of the roof trim 2 and is arranged to cover the opening 3 of the roof trim 2. The functional component 4 is disposed on a surface 21 of the flat plate 20, the surface 21 being the outer compartment side relative to the flat plate 20. The aperture 22 is formed into a rectangular shape when seen from front and is located nearer a lock-side end 20b in relation to an engagement-side end 20a. The lock-side end 20b and the engagement-side end 20a are ends along a longitudinal direction of the flat plate 20.

The cover portion 23 is arranged to project from the flat plate 20 towards the outer side of the compartment (outer compartment side) and has a semi-circle sectional shape seen from a side of the opening portion 24. The cover portion 23 is arranged to cover the aperture 22. The cover portion 23 includes the opening portion 24 at a side of the engagement-side end 20a of the flat plate 20. The opening portion 24 is formed to allow the bulb 6 to pass therethrough.

The respective engagement portions 25 formed into a rectangular column are arranged to extend from the surface 21 and are disposed nearer the engagement-side end 20a in relation to the cover portion 23. The engagement portions 25 are located along a direction perpendicular to the longitudinal direction of the flat plate 20 with a space between each other. Also, the respective engagement portions 25 include an inclined surface 27 and the engagement recess 26. The respective engaging projections 12 of the holder 7 engage with the respective engaging recesses 26.

The respective engaging recesses 26, provided on respective faces of the engagement portions 25 facing to each other, are concaved. The engaging recesses 26 are provided nearer the flat plate 20 in relation to a tip portion 25a of the engagement portion 25. The respective inclined surfaces 27 are formed on the respective faces facing to each other, each at the respective tip portions 25a of the respective engagement portions 25. The respective inclined surfaces 27 are arranged to incline so as to be tapered towards the tip portion 25a. That is, the respective inclined surfaces 27 are inclined so as to depart from each other towards the tip portion 25a of the engagement portion 25.

The engagement portions 25 are arranged to locate the holder 7 therebetween, so the respective engaging projections 12 of the holder 7 engage with the respective engaging recesses 26 so the engagement portions 25 are latched to the holder 7, fixing the holder 7 to the surface 21 of the flat plate 20.

The lock portion 30 is arranged at the lock-side end 20b of the flat plate 20. The lock portion 30 includes: a column portion 31 extending from the flat plate 20 towards the outer compartment side; and a prominent portion 32 arranged to project from an end portion 31a, distant from the flat plate 20, of the column portion 31 towards the outer compartment side, that is, the prominent portion 32 is inclined from the end portion 31a towards the flat plate 20.

When the column portion 31 passes through the opening 3 of the roof trim 2, the lock portion 30 sandwiches the roof trim 2 between the flat plate 20 and the prominent portion 32 to latch to the roof trim 2 to mount the mounting member 9 to the opening 3 of the roof trim 2.

For the illuminating lamp 1 according to the above-described embodiment, firstly the bulb 6 is mounted to the bulb-mounting portion 10 of the holder 7, then the switch unit is accommodated inside the container portion 15 while each electric wire 18 of the wire harness 17 is wired to assemble the functional component 4.

Figure 4:
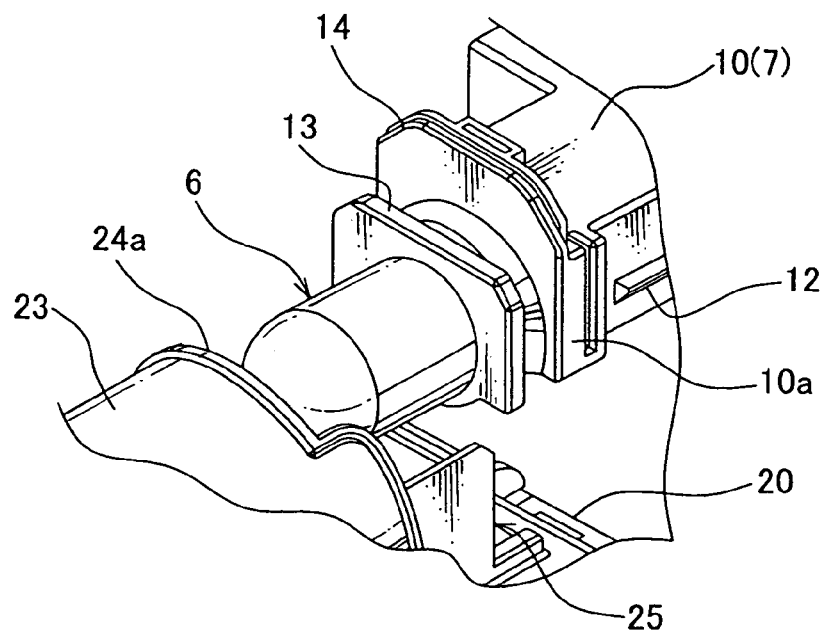
FIG. 4 is an enlarged view of a section of the functional component and the decorative component of FIG. 2.
Figure 5:
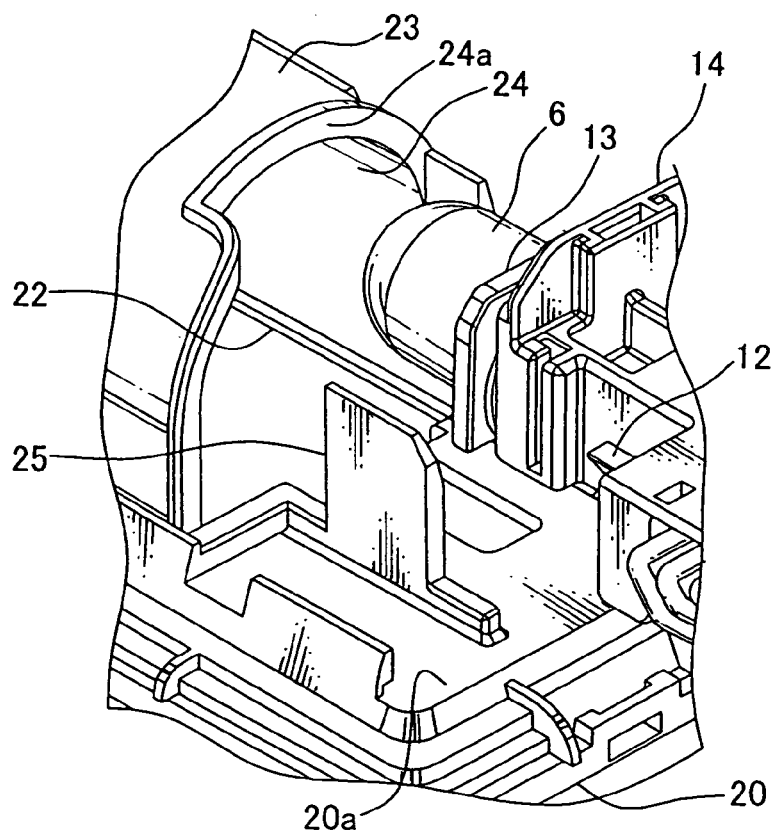
FIG. 5 is another enlarged view of another section of the functional component and the decorative component of FIG. 2.
Figure 6:
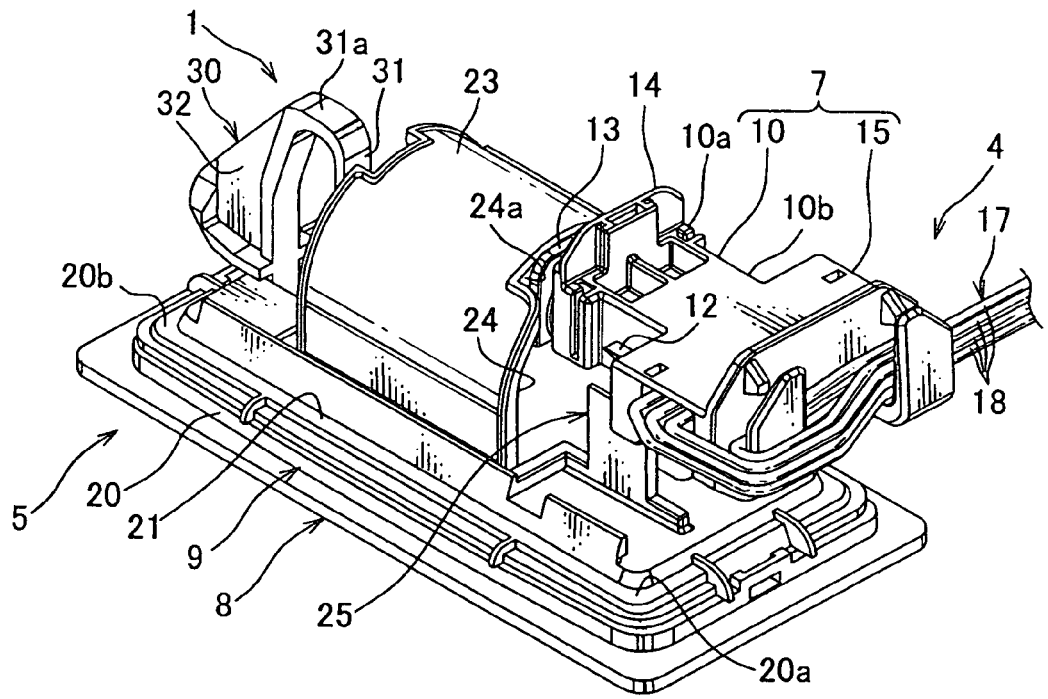
FIG. 6 is a perspective view showing a light source of the functional component being inserted into a cover portion of the decorative component.
Figure 8:
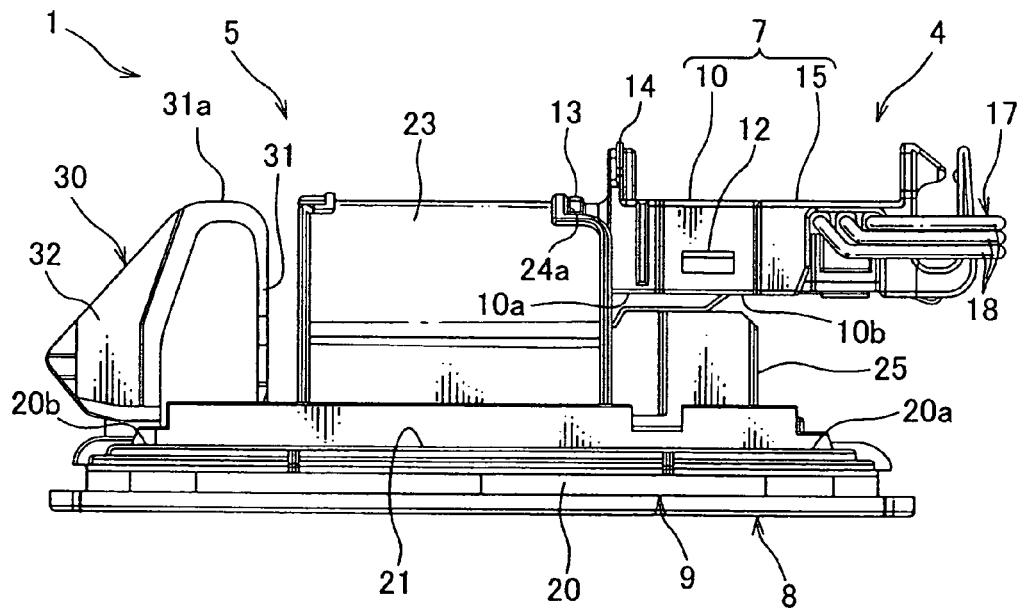
FIG. 8 is a side view of the functional component and the decorative component shown in FIG. 6.

Secondly, as shown in FIGS. 4 and 5, the bulb 6 of the functional component 4 is placed so as a relative position of the bulb 6 of the functional component 4 and the opening portion 24 of the cover portion 23 of the decorative component 5 is a face-to-face position. Then, as shown in FIG. 6 or FIG. 8, the bulb 6 is inserted into the opening portion 24 through the cover portion 23 until the contact portion 13 of the holder 7 of the functional component 4 contacts with the outer edge 24a of the opening portion 24. In this manner, the pair of engagement portions 25, provided on the flat plate 20 of the mounting member 9, and the pair of the engaging projections 12, provided to the holder 7 of the functional component 4, are arranged in a line along an engagement direction (the engagement direction is a direction perpendicular to the longitudinal direction of the flat plate 20) to be able to be engaged together.

Figure 7:
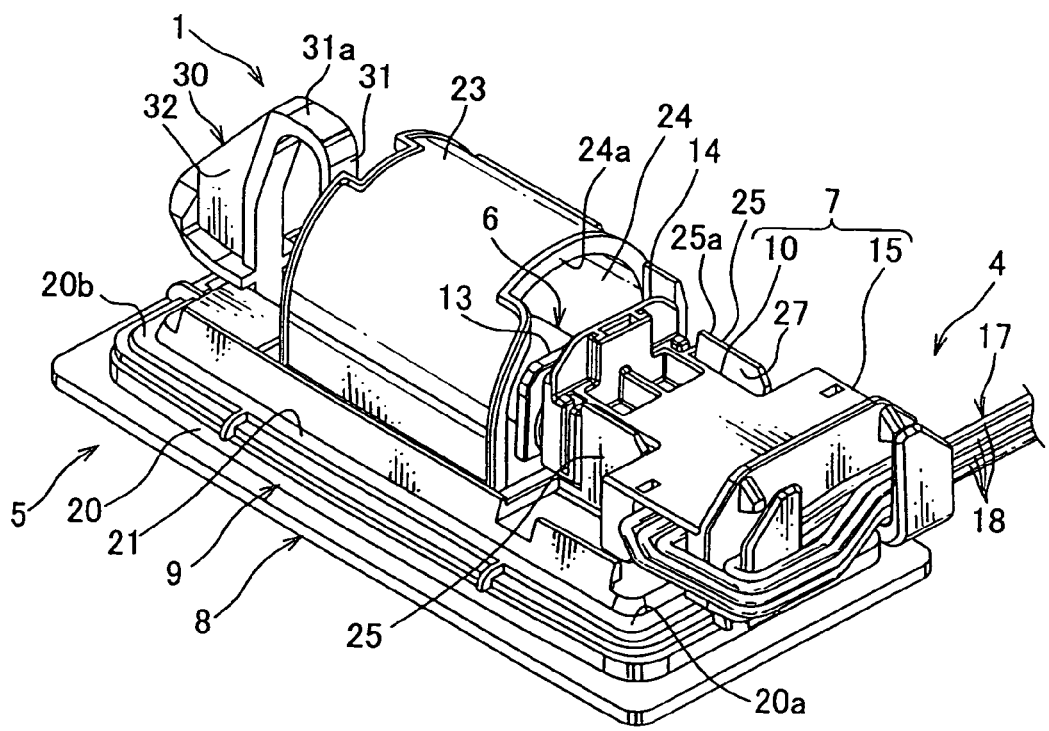
FIG. 7 is a perspective view showing engaging projections of the functional component engaged with engaging portion of the decorative component shown in FIG. 6.
Figure 9:
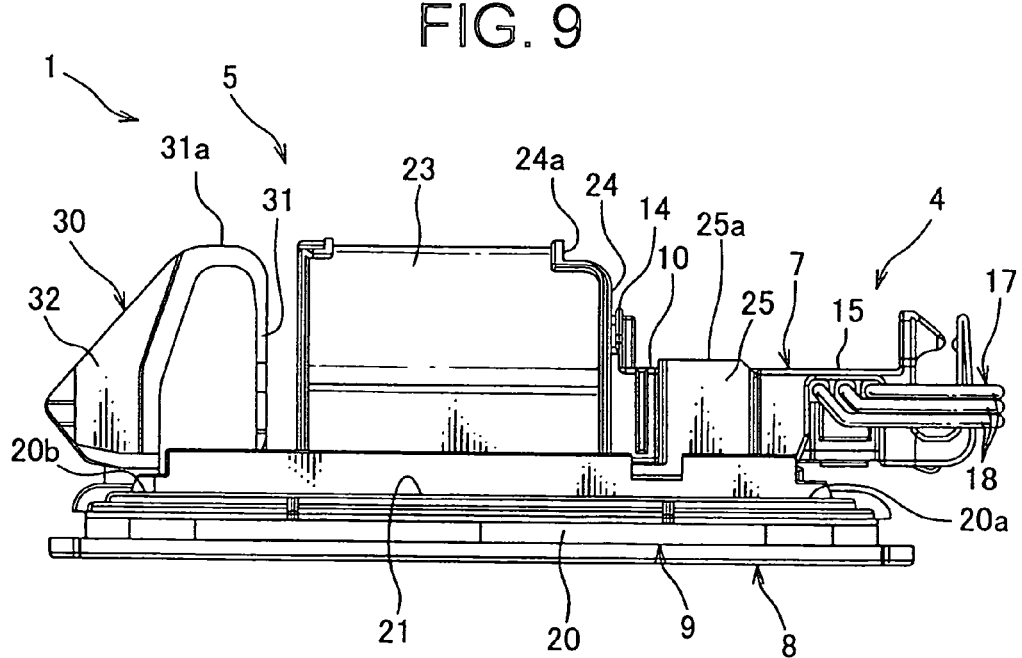
FIG. 9 is a side view of the functional component and the decorative component shown in FIG. 7.

Then the holder 7 of the functional component 4 is moved towards the flat plate 20 of the mounting member 9 of the decorative component 5, and, as shown in FIG. 7 or FIG. 9, the holder 7 is inserted between the respective engagement portions 25 extending from the flat plate 20. Then the respective engaging projections 12 of the holder 7 are engaged with the respective engaging recesses 26 of the respective engagement portions 25 to mount the holder 7 of the functional component 4 to the surface 21 of the flat plate 20 of the mounting member 9 of the decorative component 5. In this manner, the decorative component 5 is mounted to the functional component 4 to assemble the illuminating lamp 1.

When mounting the illuminating lamp 1 according to the above-described embodiment to the roof of the motor vehicle, firstly place the engagement-side end 20a of the flat plate 20 of the mounting member 9 of the decorative component 5 towards an inner edge of the opening 3 of the roof trim 2. Then, while the engagement-side end 20a of the flat plate 20 is being placed at the inner edge of the opening 3 of the roof trim 2, the lock-side end 20b of the flat plate 20 is moved towards the roof trim 2 to insert the flat plate 20 through the opening 3 of the roof trim 2. Then the column portion 31 of the lock portion 30 of the mounting member 9 is passed through the opening of the roof trim 2 to sandwich the roof trim 2 between the flat plate 20 and the prominent portion 32 to latch to the roof trim 2, mounting the mounting member 9 to the opening 3 of the roof trim 2. In this manner, the illuminating lamp 1 is mounted to the roof of the vehicle.

According to the above-described embodiment, the cover portion 23, receiving the bulb 6 and reflecting the light of the bulb 6 towards the compartment, has the opening portion 24 which opens to the engagement-side end 20a located along the longitudinal direction of the flat plate 20 and which enables the insertion of the bulb 6 therethrough along the flat plate 20.

As a result, by sliding the bulb 6 of the functional component 4 from the side of the engagement-side end 20a along the flat plate 20, the bulb 6 can be easily received inside the cover portion 23, so the functional component 4 can be easily mounted to the decorative component 5. Furthermore, since the decorative component 5 has the cover portion 23, the size of the functional component 4 can be downsized.

In addition, according to the above-described embodiment, the holder 7 includes the contact portion 13 which: contacts with the outer edge 24a of the opening portion 24 when the bulb 6 is inserted through the cover portion 23 from the opening portion 24; and serves to place the engaging projections 12 of the holder 7 and the engagement portions 25, arranged to place the holder 7 between each other and arranged to latch to the holder 7, in a line along the engagement direction (a direction perpendicular to the longitudinal direction of the flat plate 20).

Thus, by inserting the bulb 6 from the opening portion 24 and receiving the bulb 6 inside the cover portion 23, the engaging projections 12 and the engagement portions 25 can be positioned so as to be arranged in a line along the engagement direction. As a result, the pair of the engaging projections 12 and the pair of the engagement portion 25 can be securely engaged. Consequently, the holder 7 of the functional component 4 can be securely fixed to the mounting member 9 of the decorative component 5.

In addition, according to the above-described embodiment, the engagement portions 25 include the inclined surfaces 27 and the inclined surfaces 27 are arranged at faces at the tip portions 25a of the engagement portions 25 facing each other and are inclined so as to depart from each other towards the tip portion 25a. Thus the respective engaging projections 12 can be smoothly engaged with the respective engagement portions 25. As a result, the pair of engaging projections 12 and the pair of engagement portions 25 can be easily engaged together, achieving the easy mounting of the functional component 4 to the decorative component 5.

In addition, since the holder 7 has the prominent wall portion 14 closing (covering up) the opening portion 24 of the cover portion 23, the light from the bulb 6 disposed inside the cover portion 23 will not pass through the opening portion 24. As a result, the light of the bulb 6 can be successfully guided into the vehicle compartment.

The embodiment described herein only indicates the representative embodiment, and the present invention is not limited thereto. Various changes and modifications can be made within the scope of the invention.

The invention claimed is:

1. An illuminating lamp comprising:
a decorative component including a mounting member, mounted to an opening provided at an interior component of a vehicle having a compartment, and a lens mounted at a vehicle compartment side of the mounting member; and
a functional component including a light source and a holder holding the light source, wherein the holder is mounted at the mounting member,
wherein the mounting member includes: a flat plate to which the holder is mounted on a surface thereof; an aperture provided at the flat plate to transmit light of the light source into the compartment of the vehicle; and a cover portion receiving the light source thereinside, wherein the cover portion is provided at an outer side of the compartment of the flat plate so as to cover the aperture and reflect the light of the light source into the compartment,
wherein the cover portion includes an opening portion at one end thereof along a longitudinal direction of the flat plate through which the light source is inserted along the flat plate and the cover portion and the holder are separate and abut each other at one side when the light source is received thereinside the cover portion.

2. The illuminating lamp according to claim 1, wherein the decorative component includes engagement portions provided in a pair extending from the flat plate, wherein the engagement portions are arranged to locate the holder between the engagement portions and to engage with the holder,
wherein the functional component includes engaging projections provided in a pair which are arranged to project from the holder and arranged to engage with the respective engagement portions, and
wherein the holder includes a contact portion, abutting on an outer edge of the opening portion so as to place the engaging projections and the engagement portions along a direction perpendicular to a longitudinal direction of the flat plate when the light source is inserted into the cover from the opening portion.

3. The illuminating lamp according to claim 2, wherein the respective engagement portions include an inclined surface at a tip portion of the engagement portion, the inclined surfaces face each other.

4. The illuminating lamp according to any one of claim 1, wherein the holder includes a wall portion which covers the opening portion of the cover portion when the holder is mounted to the flat plate.

5. The illuminating lamp according to any one of claim 2, wherein the holder includes a wall portion which covers the opening portion of the cover portion when the holder is mounted to the flat plate.

6. The illuminating lamp according to any one of claim 3, wherein the holder includes a wall portion which covers the opening portion of the cover portion when the holder is mounted to the flat plate.

* * * * *